United States Patent
Wang et al.

(10) Patent No.: US 12,248,216 B2
(45) Date of Patent: Mar. 11, 2025

(54) BACKLIGHT MODULE AND DISPLAY MODULE

(71) Applicants: Chengdu BOE Optoelectronics Technology Co., Ltd., Sichuan (CN); BOE Technology Group Co., Ltd., Beijing (CN)

(72) Inventors: Guohui Wang, Beijing (CN); Tianma Li, Beijing (CN); Liang Li, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/022,118

(22) PCT Filed: Apr. 26, 2022

(86) PCT No.: PCT/CN2022/089320
§ 371 (c)(1),
(2) Date: Feb. 17, 2023

(87) PCT Pub. No.: WO2023/206080
PCT Pub. Date: Nov. 2, 2023

(65) Prior Publication Data
US 2024/0272479 A1  Aug. 15, 2024

(51) Int. Cl.
*G02F 1/13357* (2006.01)

(52) U.S. Cl.
CPC ............... *G02F 1/133608* (2013.01)

(58) Field of Classification Search
CPC ............ G02F 1/133608; G02F 1/133314
See application file for complete search history.

(56) References Cited

U.S. PATENT DOCUMENTS

| 2012/0113351 A1* | 5/2012 | Cheng ............... G02F 1/133608 |
| | | 362/382 |
| 2020/0341187 A1 | 10/2020 | Li |
| 2022/0163838 A1 | 5/2022 | Lin et al. |

FOREIGN PATENT DOCUMENTS

| CN | 202677012 U | 1/2013 |
| CN | 206710753 U | 12/2017 |
| CN | 209216447 U | 8/2019 |
| CN | 210222417 U | 3/2020 |

(Continued)

*Primary Examiner* — Karabi Guharay
(74) *Attorney, Agent, or Firm* — IPro, PLLC (57) ABSTRACT

The backlight module includes: a backplane and an adhesive frame. The backplane includes a bottom plate and a plurality of side plates, matching to define an accommodating space. The side plates include at least one first side plate. The first side plate has at least two clamping grooves distributed in an extending direction of the first side plate. The adhesive frame includes subframes connected with the side plates. A first subframe in the subframes is connected with the first side plate. The first subframe includes a bearing part and at least two clamping parts in correspondence with the clamping grooves. The bearing part is on a side of the accommodating space away from the bottom plate. The clamping parts are on a side of the bearing part facing the bottom plate. Each clamping part is clamped with the corresponding clamping groove in a matching mode.

20 Claims, 10 Drawing Sheets

(56) References Cited

FOREIGN PATENT DOCUMENTS

| | | | |
|---|---|---|---|
| CN | 211554571 U | | 9/2020 |
| CN | 214669968 U | | 11/2021 |
| JP | 2004258291 A | | 9/2004 |
| KR | 20160004428 A | * | 1/2016 |

* cited by examiner

BACKLIGHT MODULE AND DISPLAY MODULE

CROSS-REFERENCE OF RELATED APPLICATIONS

The present application is a national phase entry under 35 U.S.C. § 371 of International Application No. PCT/CN2022/089320, filed on Apr. 26, 2022.

FIELD

The present application relates to the technical field of display devices, in particular to a backlight module and a display module.

BACKGROUND

In a vehicle-mounted type narrow bezel display module product, a bezel on a non-IC side tends to be narrower and narrower in a current trend. Taking a display module of 12.8 inches as an example, a width of the bezel on the non-IC side is basically demanded to be about 4 mm, but a traditional bezel structural design cannot met user demands.

In a traditional display module solution, a backplane is clamped with an avoidance position of an adhesive frame through a protrusion on a side wall of the backplane, then around the display module, wrapping is performed with light shield adhesive tape from glass at an upper surface of the display module to the backplane at a lower surface of the display module, to complete fixing of the whole display module. A limit bezel width of the display module assembled in the traditional mode is greater than 5 mm which cannot meet demands of a customer for a narrow bezel.

SUMMARY

The present application provides a backlight module and a display module. The above backlight module can make a width of bezel region be reduced substantially so as to meet demands of a user for a narrow bezel display module.

In order to achieve the above objectives, the present application provides the following technical solutions.

A backlight module includes:
  a backplane, including a bottom plate and a plurality of side plates connected with an edge of the bottom plate, wherein the plurality of side plates and the bottom plate match to define an accommodating space, the plurality of side plates include at least one first side plate, and the first side plate has at least two clamping grooves distributed in an extending direction of the first side plate; and
  an adhesive frame, including a plurality of subframes connected with the plurality of side plates in a one-to-one correspondence mode, wherein a first subframe in the plurality of subframes is connected with the first side plate, the first subframe includes a bearing part and at least two clamping parts in one-to-one correspondence with the clamping grooves, the bearing part is located on a side of the accommodating space away from the bottom plate, the at least two clamping parts are located on a side of the bearing part facing the bottom plate, and each clamping part is clamped with the corresponding clamping groove in a matching mode and is completely embedded into the corresponding clamping groove.

The backlight module provided by the embodiments of the present application includes the backplane and the adhesive frame. The backplane includes the bottom plate and the plurality of side plates connected with the edge of the bottom plate. The plurality of side plates include at least one first side plate. The first side plate is provided with at least two clamping grooves distributed in an extending direction of the first side plate. The adhesive frame includes the plurality of subframes connected with the plurality of side plates in a one-to-one correspondence mode, each first subframe includes the bearing part and at least two clamping parts in one-to-one correspondence with the clamping grooves. As each clamping part is clamped with the corresponding clamping groove in a matching mode and is completely embedded into the corresponding clamping groove, after the backlight module is assembled, the clamping parts of the adhesive frame are concealed in the side plates of the backplane. Compared with the prior art, a bezel region can be reduced by one adhesive frame thickness, so a width of the bezel region is reduced substantially, and demands of a user for a narrow bezel display module are met.

Optionally, a thickness of the first side plate in a first direction is greater than a thickness of the clamping part connected with the first side plate in the first direction, and the first direction is perpendicular to an extending plane of the first side plate.

Optionally, the bearing part includes a film pressing plate located on a side, adjacent to the accommodating space, of the first side plate connected with the bearing part, the film pressing plate and the bottom plate are oppositely arranged, and the film pressing plate, the plurality of side plates and the bottom plate match to define the accommodating space.

Each clamping part is connected with an edge of the film pressing plate adjacent to the first side plate.

The clamping grooves corresponding to the clamping parts are formed in an inner wall of the first side plate, and the first side plate has a fence part located on a side of the film pressing plate away from the bottom plate.

Optionally, at least one positioning groove is further formed in the inner wall of the first side plate.

The first subframe further includes at least one positioning part in one-to-one correspondence with first positioning grooves. The at least one of the positioning parts is located on a side of the film pressing plate facing the bottom plate and connected with an edge of the film pressing plate connected with the clamping parts, each positioning part and the corresponding positioning groove are positioned in a matching mode, and the positioning part is completely embedded into the corresponding positioning groove.

Optionally; the clamping parts and the positioning parts are arranged at the edge of the film pressing plate in a staggered mode.

Optionally, the bearing part includes a film pressing plate and a side frame part. The film pressing plate is located on a side, adjacent to the accommodating space, of the first side plate connected with the bearing part, the film pressing plate and the bottom plate are oppositely arranged, the side frame part is located on a side of the first side plate away from the bottom plate and connected with an edge of the film pressing plate adjacent to the first side plate, and an outer wall of the side frame part is flush with an outer wall of the first side plate.

Each clamping part is connected with an edge of the film pressing plate connected with the side frame part.

Optionally, at least one plug-in groove is formed in a side of the bearing part facing the first side plate, at least one plug-in part in one-to-one correspondence with the at least one plug-in groove is arranged on a side of the first side plate adjacent to the bearing part, and each plug-in part is in inserting connection with the corresponding plug-in groove in a matching mode.

Optionally, the clamping parts and the plug-in grooves are arranged on the bearing part in a staggered mode.

Optionally, the clamping grooves are formed in an inner wall of the first side plate.

Optionally, the clamping grooves penetrate through the first side plate in the first direction.

Optionally, first light shield adhesive tape is attached to the outer wall of the first side plate and the outer wall of the side frame part.

Optionally; each clamping groove includes a first groove region and a second groove region distributed in a second direction. The second direction is a direction that the bearing part points to the bottom plate, a center line of the first groove region coincides with a center line of the second groove region, a width of the first groove region in a third direction is smaller than a width of the second groove region in the third direction, and the third direction is an extending direction of the first side plate where the clamping groove is located.

Each clamping part includes a connection part and a clamping hook part connected with the connection part. One end of the connection part is connected with a side of the bearing part facing the bottom plate, the clamping hook part is located at an end of the connection part away from the bearing part, the connection part is located in the first groove region, and the clamping hook part is clamped with an inner wall of the second groove region in the second groove region in a matching mode.

Optionally; a backlight assembly is further included and located in the accommodating space, and a preset gap exists between the backlight assembly and the first side plate.

Optionally, the backlight module is divided into an effective light-emitting region and a surrounding region located around the effective light-emitting region, the plurality of side plates and the adhesive frame are located in the surrounding region, and a distance between the effective light-emitting region and an outer edge of a region where the first side plates is located is smaller than 5 mm.

The present application further provides a display module, including any backlight module provided in the above technical solution and a liquid crystal display panel located on a side of the bearing part of the backlight module away from the bottom plate.

Optionally, the display module is divided into a display region corresponding to the effective light-emitting region of the backlight module and a bezel region corresponding to the surrounding region of the backlight module, and the bezel region is wrapped with second light shield adhesive tape.

REFERENCE NUMERALS

1—Backplane; 11—bottom plate; 12—side plate; 121—first side plate; 1211—clamping groove; c1—first groove region; c2—second groove region; 1212—positioning groove; 1213—plug-in part; 122—second side plate; 2—adhesive frame; 21—first subframe; 211—bearing part; 2111—film pressing plate; 2112—side frame part; 2113—plug-in groove; 212—clamping part; 2121—connection part; 2122—clamping hook part; 213—positioning part; 22—second subframe; 31—first light shield adhesive tape; 32—second light shield adhesive tape; 4—backlight assembly; 5—foam; 6—liquid crystal display panel.

DETAILED DESCRIPTION OF THE EMBODIMENTS

Technical solutions in embodiments of the present application will be clearly and completely described below with reference to the accompanying drawings in the embodiments of the present application. Apparently, the described embodiments are only some but not all of embodiments of the present application. Based on the embodiments in the present application, all other embodiments obtained by those ordinarily skilled in the art without creative work fall within the protection scope of the present application.

Figure 1:
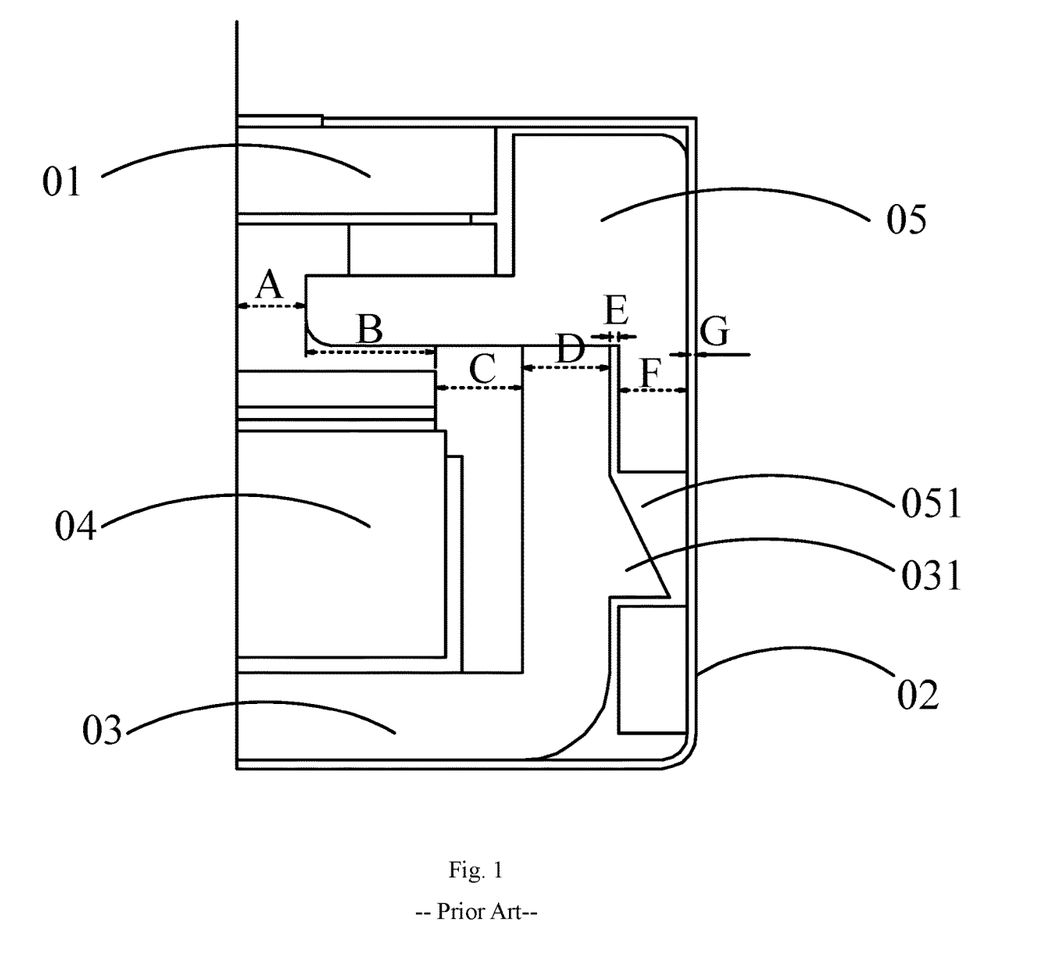
FIG. 1 is a schematic structural diagram of a display module in the prior art.

In the related art, a schematic structural diagram of a display module may be shown in FIG. 1. The display module includes a backlight module, a liquid crystal display panel 01 located on a light-emitting side of the backlight module and light shield adhesive tape 02. The backlight module includes a backplane 03, a backlight assembly 04 and an adhesive frame 05. The backplane 03 is clamped with an avoidance position 051 of the adhesive frame 05 through a protrusion 031 in a matching mode. The backlight module may include a reflector plate, a light guide plate, an optical film material and the like. The display module may be divided into a display region and a bezel region surrounding the display region. A width of the bezel region may be a sum of a distance A between the adhesive frame and the display region, a distance B of an adhesive frame film pressing material, a distance C from the optical film material to the backplane, a thickness D of the backplane, a distance E between the backplane and the adhesive frame, a thickness F of the adhesive frame and a thickness G of the light shield adhesive tape. A width of a limit bezel region of a structure in FIG. 1 is usually greater than 5 mm, which cannot meet demands of a user for a narrow bezel on a non-IC side.

Figure 2:
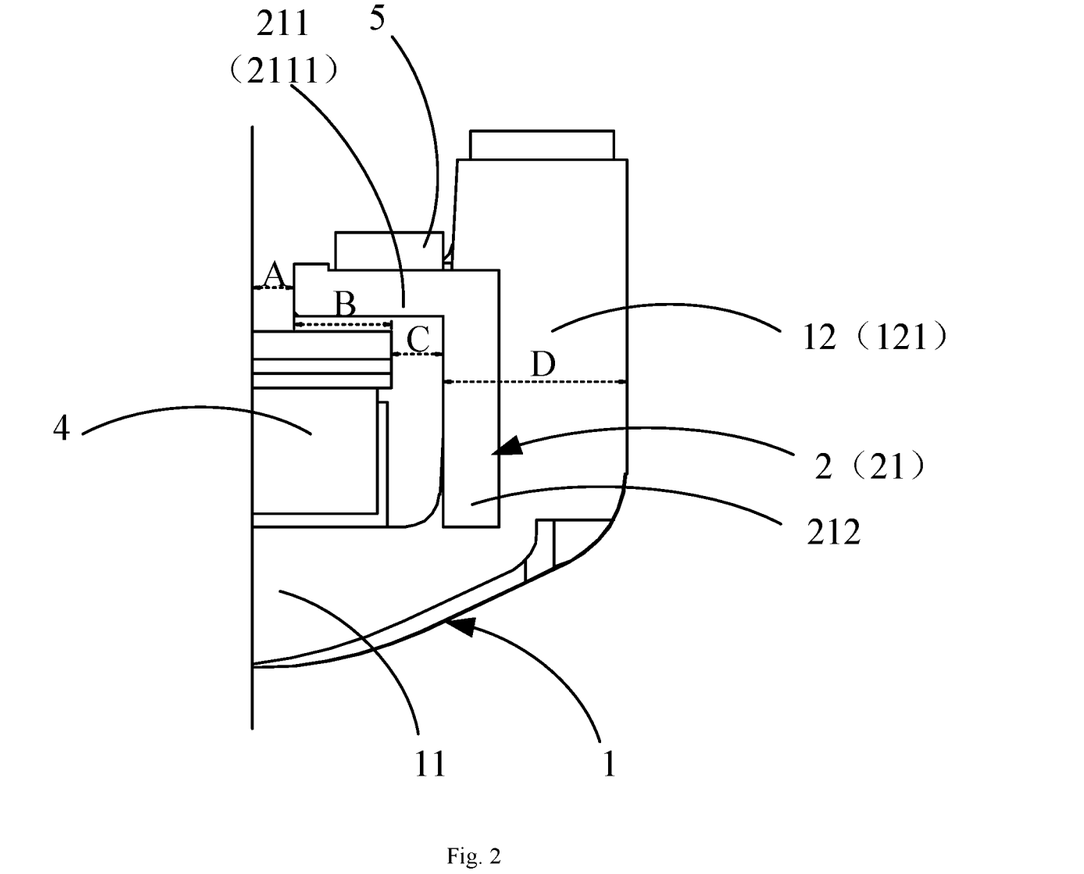
FIG. 2 is a sectional view of a backlight module provided by an embodiment of the present application.
Figure 3:
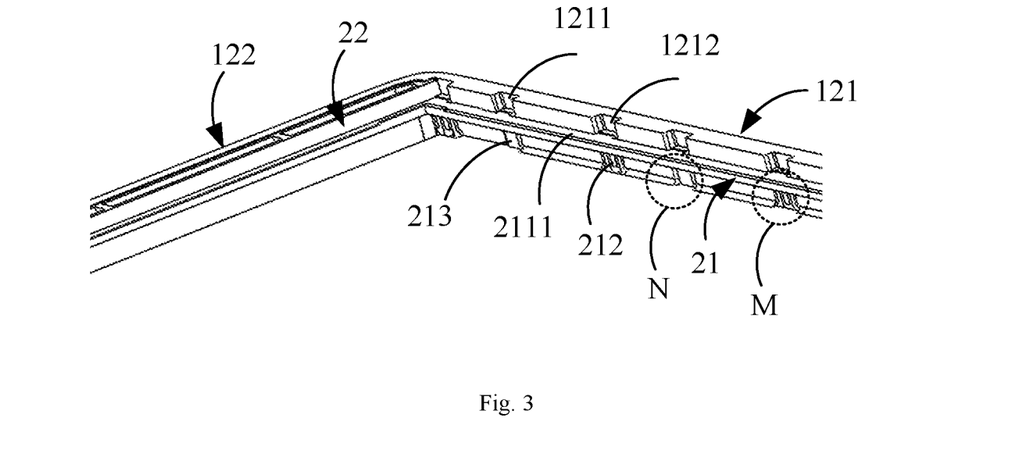
FIG. 3 is a schematic structural diagram of connection of an adhesive frame and a backplane provided by an embodiment of the present application.

In order to overcome the above defects, as shown in FIG. 2 and FIG. 3, the present application provides a backlight module which includes a backplane 1 and an adhesive frame 2.

The backplane 1 includes a bottom plate 11 and a plurality of side plates 12 connected with an edge of the bottom plate 11. The plurality of side plates 12 and the bottom plate 11 match to define an accommodating space. The plurality of side plates 12 include at least one first side plate 121. The first side plate 121 is provided with at least two clamping grooves 1211 distributed in an extending direction of the first side plate 121.

The adhesive frame 2 includes a plurality of subframes connected with the plurality of side plates in a one-to-one correspondence mode. First subframes 21 in the plurality of subframes are connected with the first side plates 121. The first subframe 21 includes a bearing part 211 and at least two clamping parts 212 in one-to-one correspondence with the clamping grooves 1211. The bearing part 211 is located on a side of the accommodating space away from the bottom plate 11. The at least two clamping parts 212 are located on a side of the bearing part 211 facing the bottom plate 11. Each clamping part 212 is clamped with a corresponding clamping groove 1211 in a matching mode and is completely embedded into the corresponding clamping groove 1211.

The backlight module provided by the embodiments of the present application includes the backplane 1 and the adhesive frame 2. The backplane 1 includes the bottom plate 11 and the plurality of side plates connected with the edge of the bottom plate 11. The plurality of side plates include at least one first side plate 121. Each first side plate 121 is provided with at least two clamping grooves 1211 distributed in an extending direction of the first side plate. The adhesive frame 2 includes the plurality of subframes connected with the plurality of side plates in a one-to-one correspondence mode. Each first subframe 21 includes the bearing part 211 and at least two clamping parts 212 in one-to-one correspondence with the clamping grooves 1211. As each clamping part 212 is clamped with the corresponding clamping groove 1211 in a matching mode and is completely embedded into the corresponding clamping groove 1211, after the backlight module is assembled, the clamping parts 212 of the adhesive frame 2 are concealed in the side plates of the backplane 1. Compared with the prior art, a bezel region can be reduced by the thickness F of the adhesive frame, so a width of the bezel region is reduced substantially, and demands of a user for a narrow bezel display module are met.

As shown in FIG. 2, the above backlight module further includes a backlight assembly 4. The backlight assembly 4 is located in the accommodating space. A preset gap exists between the backlight assembly 4 and the first side plate. The backlight assembly 4 may include a light bar, a reflector plate, a light guide plate, an optical film material and the like.

For example, the above backlight module may be divided into an effective light-emitting region and a surrounding region located around the effective light-emitting region. The plurality of side plates and the adhesive frame are located in the surrounding region. A distance between the effective light-emitting region and an outer edge of a region where the first side plate is located may be set to be smaller than 5 mm. The effective light-emitting region of the backlight module may correspond to the display region of the display module, and the surrounding region may correspond to the bezel region of the display module. That is, a width of the bezel region where the first side plate is located is smaller than 5 mm, which can meet demands of a customer for a narrow bezel.

In the backlight module provided by the above embodiments, the quantity of the clamping grooves 1211 in each first side plate 121 may be determined according to an actual length of the side plate, which is not limited herein. For example, in order to realize a fixed connection between the backplane 1 and the adhesive frame 2, four clamping parts 212 may be arranged on the first side plate 121.

For example, the above backplane 1 may have four side plates. A region where one side plate is located is an IC side of the display module. A narrow bezel is not arranged at the IC side. The other three side plates may be the first side plates 121. A region where the three side plates are located is a narrow bezel region of the display module. The clamping parts 212 on the adhesive frame 2 can be concealed in the side plates of the backplane 1, so as to realize a purpose of the narrow bezel.

Figure 4:
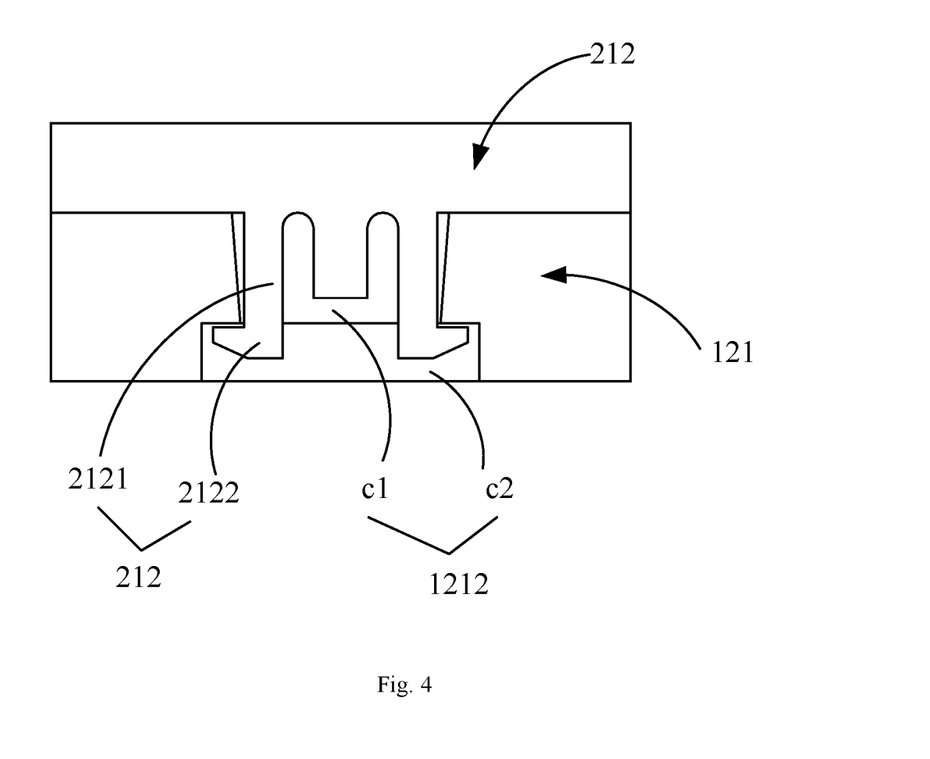
FIG. 4 is a schematic plan view of a region M in FIG. 3.

For example, as shown in FIG. 4, the clamping groove 1211 may include a first groove region c1 and a second groove region c2 distributed in a second direction. The second direction is a direction that the bearing part 211 points to the bottom plate 11. A center line of the first groove region c1 coincides with a center line of the second groove region c2. A width of the first groove region c1 in a third direction is smaller than a width of the second groove region c2 in the third direction. The third direction is an extending direction of the first side plate 121 where the clamping groove 1211 is located. The clamping part 212 includes a connection part 2121 and a clamping hook part 2122 connected with the connection part 2121. One end of the connection part 2121 is connected with a side of the bearing part 211 facing the bottom plate 11. The clamping hook part 2122 is located at an end of the connection part 2121 away from the bearing part 211. The connection part 2121 is located in the first groove region c1, and the clamping hook part 2122 is clamped with an inner wall of the second groove region c2 in the second groove region c2 in a matching mode. The clamping hook part 2122 may include two clamping hooks, and the two clamping hooks may be respectively clamped with two ends of the second groove region c2 in the third direction in a matching mode, so that movement of the adhesive frame 2 in a direction perpendicular to the bottom plate 11 can be limited. Optionally, structures of the above clamping groove 1211 and the clamping part 212 may also be other structures, which is not limited herein and may be determined according to actual conditions.

In the backlight module provided by the embodiments of the present application, a thickness of the first side plate 121 in a first direction is greater than a thickness of the clamping part 212 connected with the first side plate in the first direction. The first direction is perpendicular to an extending plane of the first side plate 121. Therefore it can be guaranteed that the clamping part 212 can be concealed in the first side plate 121. It needs to be noted that the thickness of the first side plate 121 in the first direction here is spacing between an inner wall and an outer wall of a region of the first side plate 121 where no clamping groove 1211 is formed. The thickness of the first side plate 121 in the first direction and the thickness of the clamping part 212 in the first direction are not limited here and can be determined according to actual conditions.

In a possible implementation, as shown in FIG. 2, the above bearing part 211 may include a film pressing plate 2111 located on a side, adjacent to the accommodating space, of the first side plate 121 connected with the bearing part. The film pressing plate 2111 and the bottom plate 11 are oppositely arranged. The film pressing plate, the plurality of side plates and the bottom plate 11 match to define the accommodating space. Each clamping part 212 is connected with an edge of the film pressing plate 2111 adjacent to the first side plate 121. The clamping grooves 1211 corresponding to the clamping parts 212 are formed in an inner wall of the first side plate 121. The first side plate 121 has a fence part located on a side of the film pressing plate 2111 away from the bottom plate 11. The adhesive frame 2 may be arranged on inner sides of the plurality of side plates. The clamping parts 212 on the adhesive frame 2 may be concealed in the inner walls of the first side plates 121, so that demands for a narrow bezel of the display module are met.

In the implementation, the backplane 1 may be a die casting, then the thickness of the first side plate of the backplane 1 in the first direction may be much greater than the thickness of the clamping part 212 of the adhesive frame 2 in the first direction. For example, the thickness of the first side plate may be 2 mm or above, and the thickness of the clamping part 212 of the adhesive frame 2 in the first direction may be about 0.8 mm.

Figure 5:
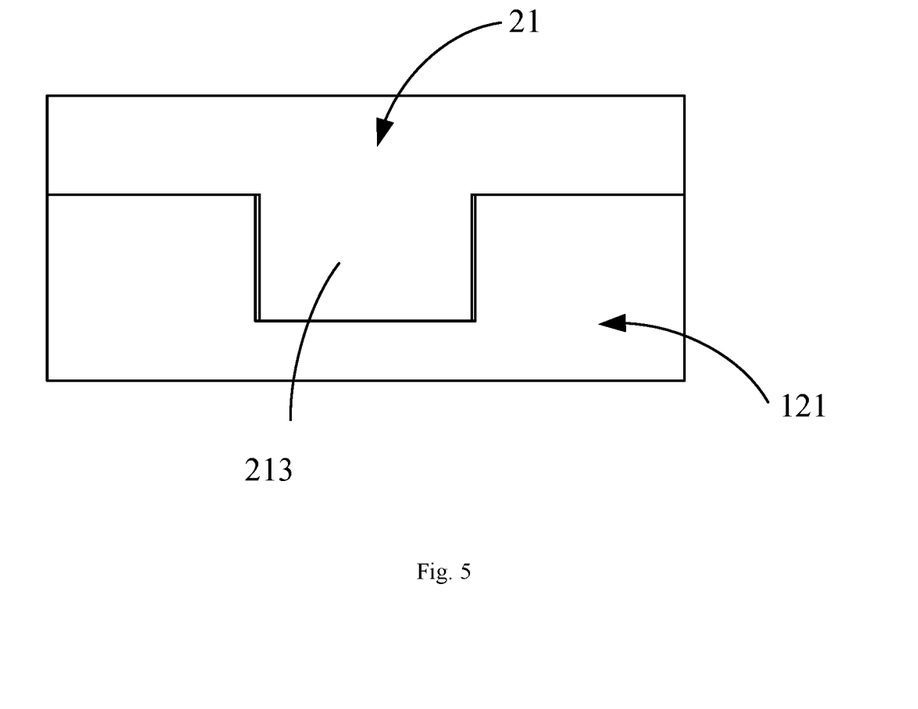
FIG. 5 is a schematic plan view of a region N in FIG. 3.

In the backlight module provided by the above embodiments, as shown in FIG. 3 and FIG. 5, at least one positioning groove 1212 may be further formed in the inner wall of the first side plate 121. The first subframe 21 may further include at least one positioning part 213 in one-to-one correspondence with first positioning grooves 1212. At least one of the positioning parts 213 is located on a side of the film pressing plate 2111 facing the bottom plate 11 and connected with an edge of the film pressing plate 2111 connected with the clamping part 212. Each positioning part 213 and the corresponding positioning groove 1212 are positioned in a matching mode, and the positioning part is completely embedded into the corresponding positioning groove 1212, so that movement of the adhesive frame 2 in a direction parallel to the bottom plate 11 can be limited without increasing the width of the bezel region, and assembling between the adhesive frame 2 and the backplane 1 is firmer.

For example, as shown in FIG. 3, the clamping parts 212 and the positioning parts 213 may be arranged at the edges of the film pressing plates 2111 in a staggered mode. After the adhesive frame 2 and the backplane 1 are assembled, a position of the adhesive frame 2 can be well limited and secured. For example, four clamping parts 212 and three positioning parts 213 may be arranged on each first subframe 21, and the clamping parts 212 and the positioning parts 213 are arranged in a staggered mode. The quantity of the positioning parts 213 is not limited here and may be determined according to actual conditions.

In the backlight module provided by the above embodiments, as shown in FIG. 3, the plurality of side plates further include second side plate(s) 122. Second subframe(s) 22 in the plurality of subframes is/are correspondingly connected with the second side plate(s) 122. The second subframe(s) 22, the side frame part(s) 2112 of the first side plate(s) 121 and the film pressing plate(s) 2111 of the first subframe(s) 21 match to define a placement space. A region where the second side plate(s) 122 is/are located is an IC side of the display module. A narrow bezel does not need to be made at the IC side. The second side plate(s) 122 and the second subframe(s) 22 may be clamped through a traditional clamping structure.

Figure 6:
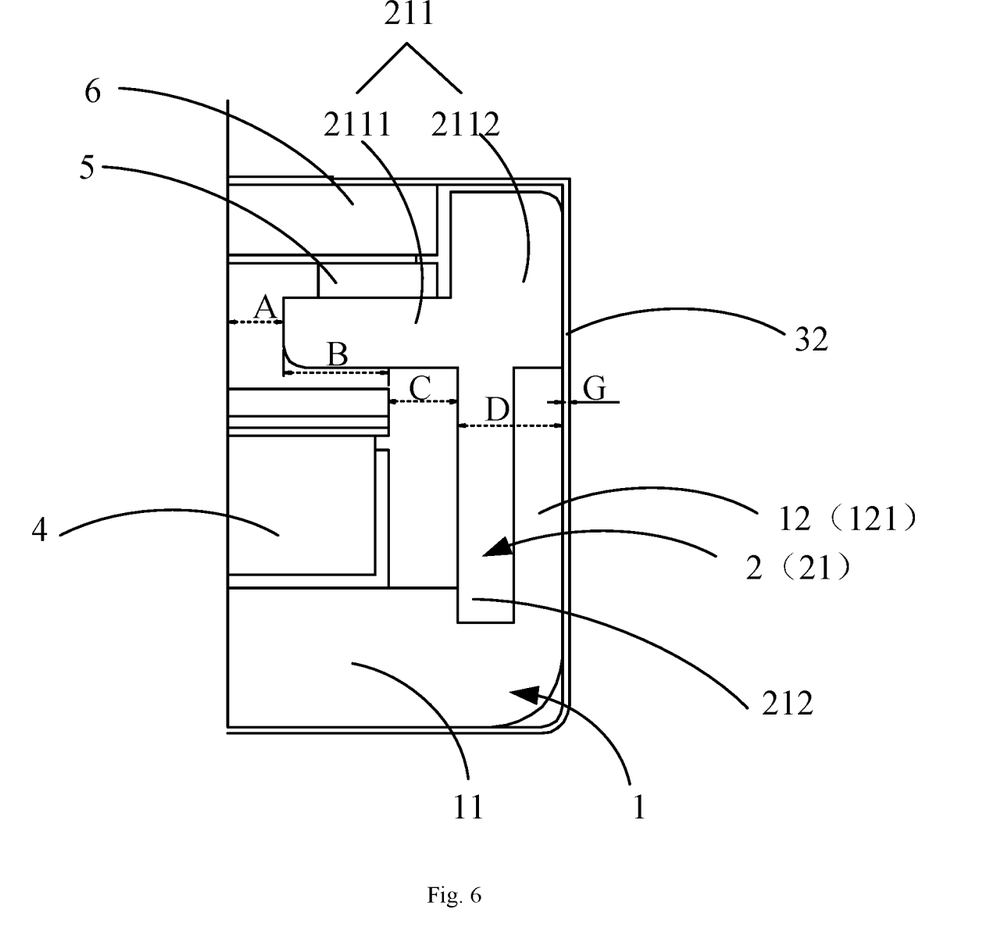
FIG. 6 is a sectional view of a display module provided by an embodiment of the present application.
Figure 9:
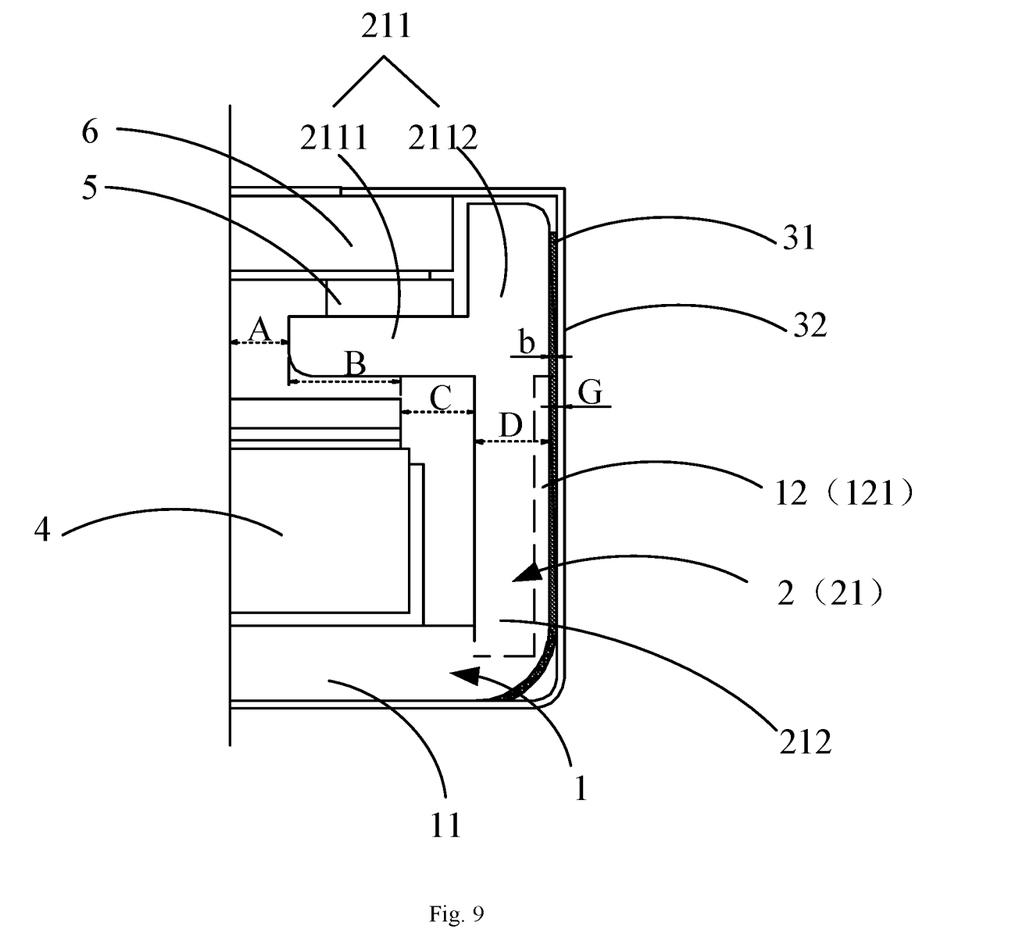
FIG. 9 is a sectional view of a display module provided by an embodiment of the present application.

In another possible implementation, as shown in FIG. 6 and FIG. 9, the above bearing part 211 may include a film pressing plate 2111 and a side frame part 2112. The film pressing plate 2111 is located on a side, adjacent to the accommodating space, of the first side plate 121 connected with the bearing part. The film pressing plate and the bottom plate 11 are oppositely arranged. The side frame part 2112 is located on a side of the first side plate 121 away from the bottom plate 11 and connected with an edge of the film pressing plate 2111 adjacent to the first side plate 121. An outer wall of the side frame part 2112 is flush with an outer wall of the first side plate 121. Each clamping part 212 is connected with an edge of the film pressing plate 2111 connected with the side frame part 2112. In this structure, the backplane 1 may be a die casting or a sheet metal part, the thickness of the first side plate 121 of the backplane 1 in the first direction may be a little different from the thickness of the clamping part 212 on the adhesive frame 2 in the first direction.

Figure 7:
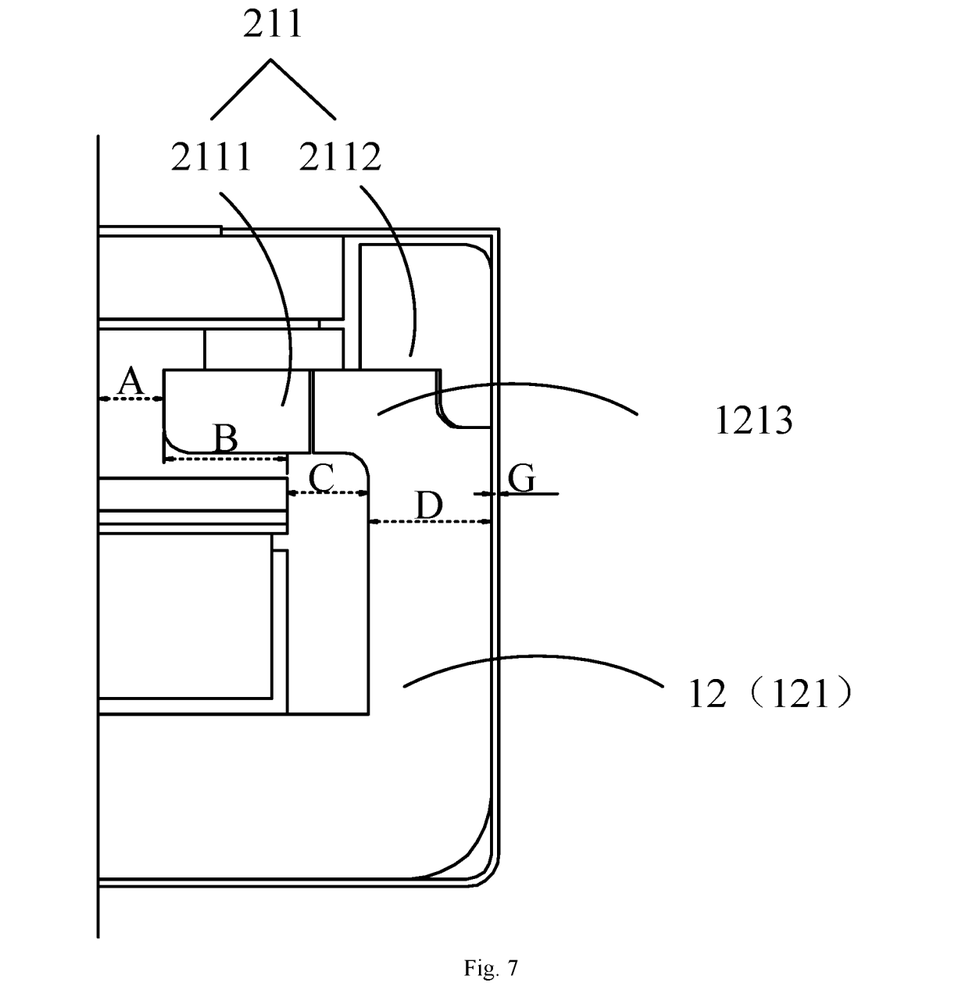
FIG. 7 is a sectional view of a display module provided by an embodiment of the present application.
Figure 8:
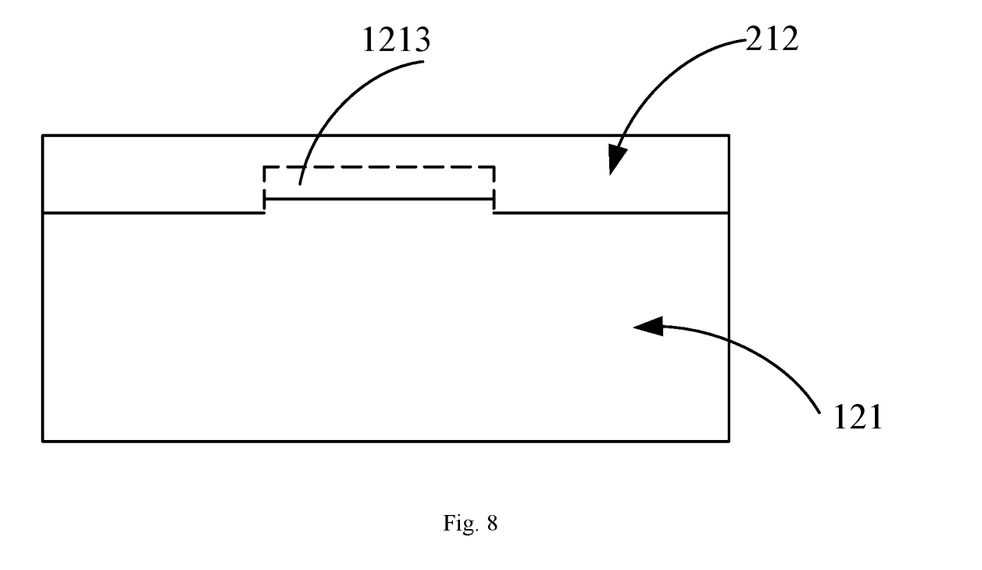
FIG. 8 is a schematic plan view of matching and inserting connection of a plug-in part and a plug-in groove provided by an embodiment of the present application.
Figure 10:
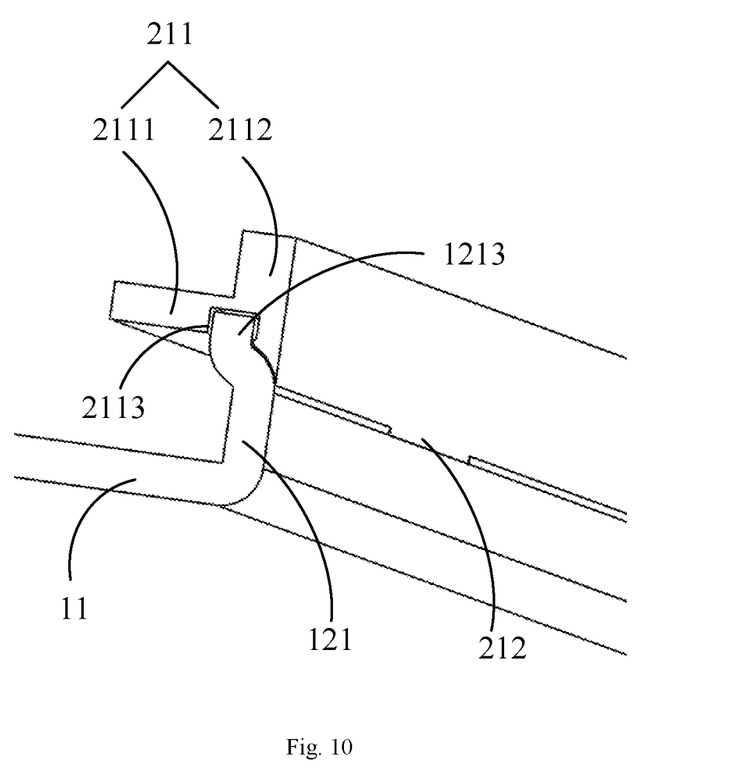
FIG. 10 is a schematic structural diagram of matching and inserting connection of a plug-in part and a plug-in groove provided by an embodiment of the present application.

In the backlight module provided by the above embodiments, as shown in FIG. 7, FIG. 8 and FIG. 10, at least one plug-in groove 2113 may be formed in a side of the bearing part 211 facing the first side plate 121. At least one plug-in part 1213 in one-to-one correspondence with the plug-in groove(s) 2113 is arranged on a side of the first side plate 121 adjacent to the bearing part 211. Each plug-in part 1213 may be in inserting connection with the corresponding plug-in groove 2113 in a matching mode. Through matching and inserting connection of the plug-in part 1213 and the plug-in groove 2113, movement of the adhesive frame 2 in the direction parallel to the bottom plate 11 can be limited without increasing the width of the bezel region, so assembling between the adhesive frame 2 and the backplane 1 is firmer.

For example, the above clamping parts 212 and the plug-in grooves 2113 may be arranged on the bearing part 211 in a staggered mode. After the adhesive frame 2 and the backplane 1 are assembled, the position of the adhesive frame 2 may be well limited and secured.

In the backlight module provided by the above embodiments, as shown in FIG. 6, the above clamping groove 1211 may be formed in the inner wall of the first side plate 121. This structure may be suitable for a case that the thickness of the first side plate 121 of the backplane 1 in the first direction is a little greater than the thickness of the clamping part 212 on the adhesive frame 2 in the first direction. For example, the thickness of the first side plate 121 in the first direction is about 1.5 mm, and the thickness of the clamping part 212 in the first direction is about 0.8 mm. For example, in this structure, the backplane 1 may be a die casting.

Optionally, as shown in FIG. 9, the above clamping groove 1211 may penetrate through the first side plate 121 in the first direction. This structure may be suitable for a case that the thickness of the first side plate 121 of the backplane 1 in the first direction is approximately equal to the thickness of the clamping part 212 of the adhesive frame 2 in the first direction. For example, the thickness of the first side plate 121 in the first direction is about 1.0 mm, and the thickness of the adhesive frame 2 in the first direction is about 0.8 mm. For example, in this structure, the backplane 1 may be a sheet metal part.

Figure 11:
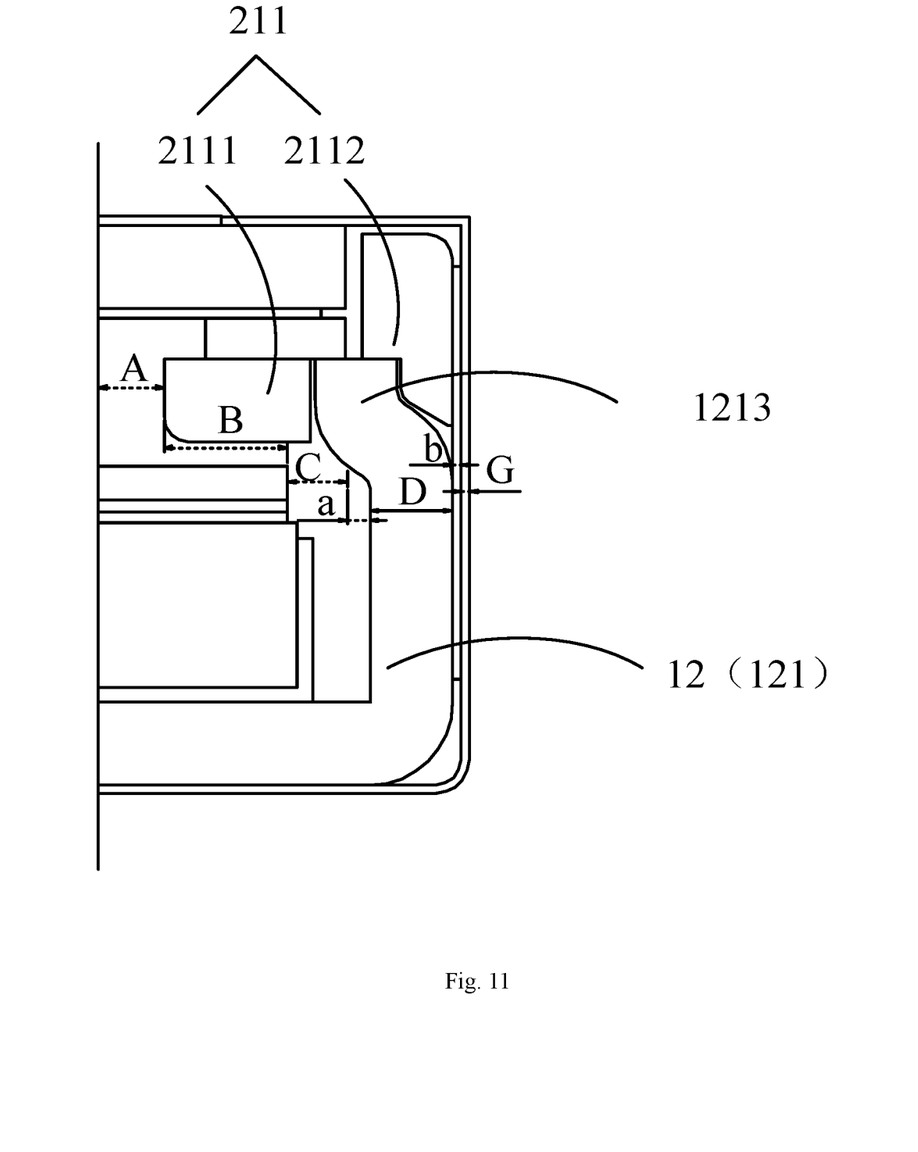
FIG. 11 is a sectional view of a display module provided by an embodiment of the present application.

As shown in FIG. 10 and FIG. 11, the plug-in part 1213 of the backlight module in FIG. 9 may be a bent part on the first side plate 121 which is bent towards a side where the accommodating space is located, a plug-in area of the plug-in part 1213 and the plug-in groove 2113 can be increased, and stability of the backlight module is improved.

For example, as the clamping groove 1211 penetrates through the first side plate 121, in order to prevent a side wall of the backlight module from leaking light, first light shield adhesive tape 31 may be attached to an outer wall of the first side plate 121 and an outer wall of the side frame part 2112, so a backlight effect is improved.

In the backlight module provided by the above embodiments, the plurality of side plates may further include the second side plate(s). Second subframe(s) in the plurality of subframe(s) are correspondingly connected with the second side plate(s). The second subframe(s), the film pressing plate(s) 2111 and the side frame part(s) of the first subframe(s) match to define the placement space. The region where the second side plate(s) are located is the IC side of the display module. The narrow bezel does not need to be made at the IC side. The second side plate(s) and the second subframe(s) may be clamped through the traditional clamping structure.

The present application further provides a display module, including any backlight module provided in the above technical solution and a liquid crystal display panel 6 located on a side of a bearing part 211 of the backlight module away from a bottom plate 11.

For example, as shown in FIG. 2, FIG. 6 and FIG. 9, the above liquid crystal display panel 6 may be arranged in a placement space of the backlight module. Foam 5 is further arranged on a side of a film pressing plate 2111 of the bearing part 211 facing the liquid crystal display panel 6 so as to protect the liquid crystal display panel 6.

The display module provided by the above embodiments may be divided into a display region corresponding to an effective light-emitting region of the backlight module and a bezel region corresponding to a surrounding region of the backlight module, and the bezel region is wrapped with second light shield adhesive tape. As shown in FIG. 6, FIG. 9 and FIG. 11, when a thickness of a first side plate in the backlight module is not much greater than a thickness of the clamping part of an adhesive frame, during assembling of the liquid crystal display panel 6 and the backlight module, the bezel region of the display module may be wrapped with the second light shield adhesive tape 32 from an upper surface of the liquid crystal display panel 6 to a lower surface of the backplane 1, so as to complete assembling and securing of the display module. A region where second side plates 122 of the backlight module are located corresponds to the bezel region with a drive IC of the liquid crystal display panel 6, and no narrow bezel needs to be arranged in this region.

A width of the bezel region of the display module differs with differing of a structure of the above display module. For example, as shown in FIG. 2, in the above display module, a width of the bezel region where the first side plates are located is a sum of a distance A between the adhesive frame and the display region, a distance B of an adhesive frame film pressing material, a distance C from an optical film material to a backplane and a thickness D of the backplane, and no second light shield adhesive tape may need to be arranged in an assembling process of the display module. The distance A between the adhesive frame and the display region may be 0.6 mm, and the distance B of the adhesive frame film pressing material may be 1.5 mm. The distance C from the optical film material to the backplane is greater than or equal to a total length L of a film×expansion factor/2. The expansion factor of the film is usually 0.4%, so the distance C from the optical film material to the backplane is 300× 0.4%/2. The thickness D (a thickness of the first side plate in the first direction) of the backplane may be 2 mm. A width of the bezel region corresponding to a narrow bezel of the display module is 4.7 mm which is smaller than 5 mm in the prior art. This structure can reduce one adhesive frame thickness F, and the width of the bezel region is reduced substantially, so as to meet demands of a user for a narrow bezel display module.

For example, as shown in FIG. 6 and FIG. 7, in the above display module, a width of the bezel region where the first side plates are located is a sum of the distance A between the adhesive frame and the display region, the distance B of the adhesive frame film pressing material, the distance C from the optical film material to the backplane, the thickness D of the backplane and a thickness G of the second light shield adhesive tape. The distance A between the adhesive frame and the display region may be 0.6 mm. The distance B of the adhesive frame film pressing material may be 1.5 mm. The distance C from the optical film material to the backplane is greater than or equal to the total length L of the film× expansion factor/2. The expansion factor of the film is usually 0.4%, so the distance C from the optical film material to the backplane is 300×0.4%/2. The thickness D (a thickness of the first side plate in the first direction) of the backplane may be 1.5 mm. The thickness of the second light shield adhesive tape may be 0.1 mm. The width of the bezel region corresponding to the narrow bezel of the display module is 4.3 mm which is smaller than 5 mm in the prior art. This structure can reduce one adhesive frame thickness F, and the width of the bezel region is reduced substantially, so as to meet the demands of the user for the narrow bezel display module.

For example, as shown in FIG. 9, in the above display module, the width of the bezel region where the first side plates are located is a sum of the distance A between the adhesive frame and the display region, the distance B of the adhesive frame film pressing material, the distance C from the optical film material to the backplane, the thickness D of the backplane, a thickness b of first light shield adhesive tape and the thickness G of the second light shield adhesive tape. The distance A between the adhesive frame and the display region may be 0.6 mm. The distance B of the adhesive frame film pressing material may be 1.5 mm. The distance C from the optical film material to the backplane is greater than or equal to the total length L of the film×expansion factor/2. The expansion factor of the film is usually 0.4%, so the distance C from the optical film material to the backplane is 300×0.4%/2. The thickness D (the thickness of the first side plate in the first direction) of the backplane may be 1 mm. The thickness b of the first light shield adhesive tape may be 0.05. The thickness G of the second light shield adhesive tape may be 0.1 mm. The width of the bezel region corresponding to the narrow bezel of the display module is 3.85 mm which is far smaller than 5 mm in the prior art, so the width of the bezel region is substantially reduced, and the demands of the user for the narrow bezel display module are met.

For example, as shown in FIG. 11, when a structure of the plug-in part is a bent part, the width of the bezel region is increased. In the above display module, the width of the bezel region where the first side plates are located is a sum of the distance A between the adhesive frame and the display region, the distance B of the adhesive frame film pressing material, the distance C from the optical film material to the backplane, the thickness D of the backplane, the thickness b of the first light shield adhesive tape, the thickness G of the second light shield adhesive tape and a redundant thickness a when the bent part is bent. The distance A between the adhesive frame and the display region may be 0.6 mm. The distance B of the adhesive frame film pressing material may be 1.5 mm. The distance C from the optical film material to the backplane is greater than or equal to the total length L of the film×expansion factor/2. The expansion factor of the film is usually 0.4%, so the distance C from the optical film material to the backplane is 300×0.4%/2. The thickness D (the thickness of the first side plate in the first direction) of the backplane may be 1 mm. The thickness b of the first light shield adhesive tape may be 0.05. The thickness G of the second light shield adhesive tape may be 0.1 mm. The redundant thickness a when the bent part is bent may be 0.1 mm. The width of the bezel region corresponding to the narrow bezel of the display module is 4.15 mm which is far smaller than 5 mm in the prior art, so the width of the bezel region is substantially reduced, and the demands of the user for the narrow bezel display module are met.

Apparently, those skilled in the art may make various changes and variations for the embodiments of the present application without departing from the spirit and scope of the present application. In this case, if these changes and variations of the present application fall within the scope of the claims of the present application and their equivalents, the present application also intends to contain these changes and variations.

What is claimed is:

1. A backlight module, comprising:
   a backplane, comprising:
      a bottom plate, and
      a plurality of side plates connected with an edge of the bottom plate,
      wherein the plurality of side plates and the bottom plate match to define an accommodating space, the plurality of side plates comprise at least one first side plate, and the first side plate is provided with at least two clamping grooves distributed in an extending direction of the first side plate; and
   an adhesive frame, comprising:
      a plurality of subframes connected with the plurality of side plates in a one-to-one correspondence mode,
      wherein a first subframe in the plurality of subframes is connected with the first side plate, the first subframe comprises:
         a bearing part, and
         at least two clamping parts in one-to-one correspondence with the clamping grooves,
         wherein the bearing part is located on a side of the accommodating space away from the bottom plate, the at least two clamping parts are located on a side of the bearing part facing the bottom plate, and the clamping parts each is clamped with a corresponding one of the clamping grooves in a matching mode and is completely embedded into the corresponding one of the clamping grooves;
         a thickness of the first side plate in a first direction is greater than a thickness of the clamping part connected with the first side plate in the first direction, wherein the first direction is perpendicular to an extending plane of the first side plate.

2. The backlight module according to claim 1, wherein the bearing part comprises:
   a film pressing plate located on a side, adjacent to the accommodating space, of the first side plate connected with the bearing part,
   wherein the film pressing plate and the bottom plate are oppositely arranged, and the film pressing plate, the plurality of side plates and the bottom plate match to define the accommodating space;
   each clamping part is connected with an edge of the film pressing plate adjacent to the first side plate; and
   the clamping grooves corresponding to the clamping parts are formed in an inner wall of the first side plate, and the first side plate is provided with a fence part located on a side of the film pressing plate away from the bottom plate.

3. The backlight module according to claim 2, wherein at least one positioning groove is further formed in the inner wall of the first side plate; and
   the first subframe further comprises:
      at least one positioning part in one-to-one correspondence with first positioning grooves,
      wherein the at least one of the positioning parts is located on a side of the film pressing plate facing the bottom plate and connected with an edge of the film pressing plate connected with the clamping parts, each positioning part and the corresponding positioning groove are positioned in a matching mode, and the positioning part is completely embedded into the corresponding positioning groove.

4. The backlight module according to claim 3, wherein the clamping parts and the positioning parts are arranged at the edge of the film pressing plate in a staggered mode.

5. The backlight module according to claim 1, wherein the bearing part comprises:
   a film pressing plate, and
   a side frame part,
   wherein the film pressing plate is located on a side, adjacent to the accommodating space, of the first side plate connected with the bearing part, the film pressing plate and the bottom plate are oppositely arranged, the side frame part is located on a side of the first side plate away from the bottom plate and connected with an edge of the film pressing plate adjacent to the first side plate, and an outer wall of the side frame part is flush with an outer wall of the first side plate; and
   each clamping part is connected with an edge of the film pressing plate connected with the side frame part.

6. The backlight module according to claim 5, wherein at least one plug-in groove is formed in a side of the bearing part facing the first side plate, at least one plug-in part in one-to-one correspondence with the at least one plug-in groove is arranged on a side of the first side plate adjacent to the bearing part, and each plug-in part is in inserting connection with the corresponding plug-in groove in a matching mode.

7. The backlight module according to claim 6, wherein the clamping parts and the plug-in grooves are arranged on the bearing part in a staggered mode.

8. The backlight module according to claim 5, wherein the clamping grooves are formed in an inner wall of the first side plate.

9. The backlight module according to claim 5, wherein the clamping grooves penetrate through the first side plate in the first direction.

10. The backlight module according to claim 9, wherein first light shield adhesive tape is attached to the outer wall of the first side plate and the outer wall of the side frame part.

11. The backlight module according to claim 1, wherein the clamping groove comprises:
    a first groove region and a second groove region distributed in a second direction,
    wherein the second direction is a direction that the bearing part points to the bottom plate, a center line of the first groove region coincides with a center line of the second groove region, a width of the first groove region in a third direction is smaller than a width of the second groove region in the third direction, and the third direction is an extending direction of the first side plate where the clamping groove is located; and the clamping part comprises:
a connection part, and
a clamping hook part connected with the connection part,
wherein one end of the connection part is connected with a side of the bearing part facing the bottom plate, the clamping hook part is located at an end of the connection part away from the bearing part, the connection part is located in the first groove region, and the clamping hook part is clamped with an inner wall of the second groove region in the second groove region in a matching mode.

12. The backlight module according to claim 1, further comprising:
a backlight assembly,
wherein the backlight assembly is located in the accommodating space, and a preset gap exists between the backlight assembly and the first side plate.

13. The backlight module according to claim 1, wherein the backlight module is divided into an effective light-emitting region and a surrounding region located around the effective light-emitting region, the plurality of side plates and the adhesive frame are located in the surrounding region, and a distance between the effective light-emitting region and an outer edge of a region where the first side plate is located is smaller than 5 mm.

14. A display module, comprising:
the backlight module according to claim 1, and
a liquid crystal display panel located on a side of the bearing part of the backlight module away from the bottom plate.

15. The display module according to claim 14, wherein the display module is divided into a display region corresponding to the effective light-emitting region of the backlight module and a bezel region corresponding to the surrounding region of the backlight module, wherein the bezel region is wrapped with second light shield adhesive tape.

16. A backlight module, comprising:
a backplane, comprising:
a bottom plate, and
a plurality of side plates connected with an edge of the bottom plate,
wherein the plurality of side plates and the bottom plate match to define an accommodating space, the plurality of side plates comprise at least one first side plate, and the first side plate is provided with at least two clamping grooves distributed in an extending direction of the first side plate; and
an adhesive frame, comprising:
a plurality of subframes connected with the plurality of side plates in a one-to-one correspondence mode,
wherein a first subframe in the plurality of subframes is connected with the first side plate, the first subframe comprises:
a bearing part, and
at least two clamping parts in one-to-one correspondence with the clamping grooves,
wherein the bearing part is located on a side of the accommodating space away from the bottom plate, the at least two clamping parts are located on a side of the bearing part facing the bottom plate, and the clamping parts each is clamped with a corresponding one of the clamping grooves in a matching mode and is completely embedded into the corresponding one of the clamping grooves;
wherein the clamping groove comprises:
a first groove region and a second groove region distributed in a first direction,
wherein the first direction is a direction that the bearing part points to the bottom plate, a center line of the first groove region coincides with a center line of the second groove region, a width of the first groove region in a second direction is smaller than a width of the second groove region in the second direction, and the second direction is an extending direction of the first side plate where the clamping groove is located; and
the clamping part comprises:
a connection part, and
a clamping hook part connected with the connection part,
wherein one end of the connection part is connected with a side of the bearing part facing the bottom plate, the clamping hook part is located at an end of the connection part away from the bearing part, the connection part is located in the first groove region, and the clamping hook part is clamped with an inner wall of the second groove region in the second groove region in a matching mode.

17. The backlight module according to claim 16, further comprising:
a backlight assembly,
wherein the backlight assembly is located in the accommodating space, and a preset gap exists between the backlight assembly and the first side plate.

18. The backlight module according to claim 16, wherein the backlight module is divided into an effective light-emitting region and a surrounding region located around the effective light-emitting region, the plurality of side plates and the adhesive frame are located in the surrounding region, and a distance between the effective light-emitting region and an outer edge of a region where the first side plate is located is smaller than 5 mm.

19. A display module, comprising:
the backlight module according to claim 16, and
a liquid crystal display panel located on a side of the bearing part of the backlight module away from the bottom plate.

20. The display module according to claim 19, wherein the display module is divided into a display region corresponding to the effective light-emitting region of the backlight module and a bezel region corresponding to the surrounding region of the backlight module, wherein the bezel region is wrapped with second light shield adhesive tape.

* * * * *